Nov. 3, 1925.
C. THOMPSON
GLARESHIELD
Filed May 17, 1924
1,560,002
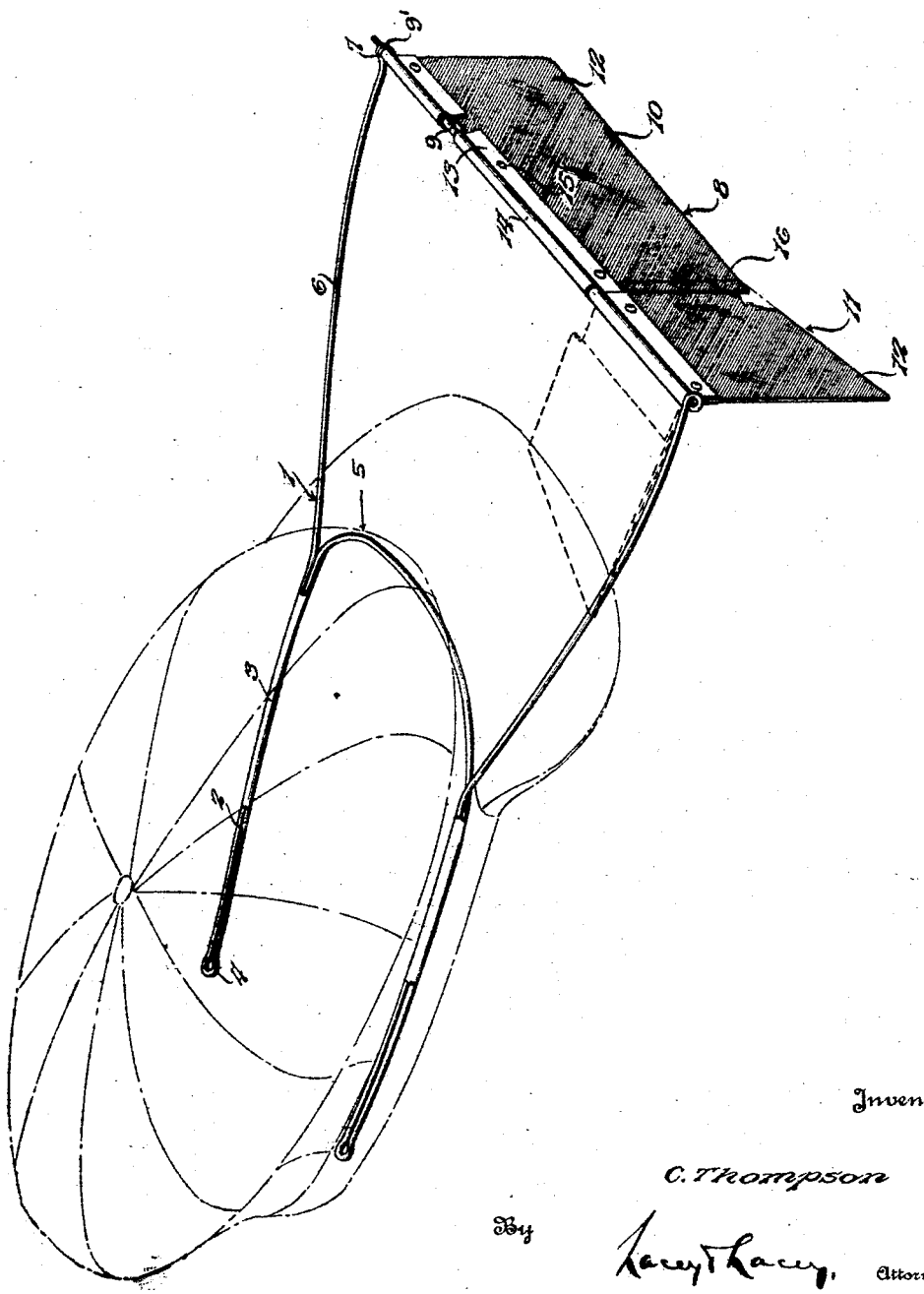
Inventor
C. Thompson
By Lacey & Lacey, Attorneys Patented Nov. 3, 1925.

1,560,002

UNITED STATES PATENT OFFICE.

CHRISTIAN THOMPSON, OF SALT LAKE CITY, UTAH.

GLARESHIELD.

Application filed May 17, 1924. Serial No. 713,971.

*To all whom it may concern:*

Be it known that I, CHRISTIAN THOMPSON, citizen of the United States, residing at Salt Lake City, in the county of Salt Lake and State of Utah, have invented certain new and useful Improvements in Glareshields, of which the following is a specification.

This invention relates to improvements in devices for shielding the eyes of automobilists from the glare of the headlights of an approaching car at night, and from the rays of the sun during daylight hours. Many such devices have heretofore been employed but, so far as I am aware, substantially all of them have been constructed for attachment to the windshield or some other part of the automobile and therefore have occupied fixed positions. As a consequence, they more or less obstruct the driver's view of the roadway when driving at night and, therefore, their presence is objectionable except when approaching a car with glaring headlights.

It is, therefore, one of the objects of the present invention to provide a device for the purpose stated which may be applied to any ordinary cap or hat and which will overcome the disadvantages presented by devices of the type above referred to, the glare shield of the device being so supported that it may be brought into position to effectually shield the eyes of the driver by a slight forward inclination of the head and, when the head is elevated and in normal position, the said shield will be so supported as to not obstruct the driver's view of the roadway.

Another object of the invention is to so construct the glare shield that a section thereof may be folded back entirely out of position in front of the eyes of the wearer, when driving at night, so as to provide for an unobstructed view of the roadway, this section being adapted, however, to be moved to position for use during daylight hours.

The figure of the accompanying drawing is a perspective view of the device embodying the invention applied to a cap which is shown in broken lines.

Generally speaking, the device embodying the invention comprises a frame which is adapted to be fitted to any ordinary cap or hat and supported by the brim or visor of the hat or cap, and a glare screen which is swingingly suspended from a front cross member of the frame. In the drawing, the frame is indicated in general by the numeral 1 and is preferably formed from a suitable length of wire which is preferably resilient. The said frame 1 comprises side members 2 which are preferably formed by bending the wire from which the frame is formed, at suitably spaced points, so that strands of the wire will lie in contact with each other, and, if desired, these strands may be united for a portion of the length of the side members 2, by applying solder thereto, as indicated by the numeral 3. The bends in the wire, referred to above, are indicated by the numeral 4 and are located at the rear ends of said side members. These bends are more or less blunt so that when the frame is applied to the cap or hat, there will be no sharp or pointed wire ends to cause injury to the material of the cap or hat. The numeral 5 indicates an arcuate bowed member which is integrally connected with one of the strands of the side members, the said bowed member extending between the side members and being so formed as to fit more or less snugly against and conform to the contour of the forward side of the cap or hat to which the device is applied. The other strands of the side members 2 are extended forwardly beyond the bow 5 so as to provide supporting arms 6 which are preferably curved outwardly and one of which is provided at its outer end with an eye indicated by the numeral 7.

The glare shield of the device is indicated in general by the numeral 8 and the said shield is suspended from a cross bar 9 which is an integral continuation of the end of the other supporting arm 6, the free end of the cross bar being threaded and fitted through the eye 7 and having a nut 9' fitted thereon. The glare shield 8 comprises two sections, one of which is indicated in general by the numeral 10 and the other by the numeral 11. Each of these sections comprises a sheet 12 of celluloid or the like which is preferably colored green and which is disposed at its upper edge between the folds 13 of a suspension member which is preferably formed from a sheet metal blank and is bent or folded longitudinally medially to provide a sleeve portion 14 connecting the folds and pivotally fitting the cross rod 9. Rivets or other securing elements 15 are secured through the folds 13 and through the upper marginal portions of the respective sheets 12, and in this manner the said sheets are suspended for swinging movement from the cross rod 9. By reference to the drawings, it will be observed that the shield section 10 is of greater length than the section 11 and that the said sections are independently supported for swinging movement from the cross rod 9. It will likewise be observed that the section 11 is provided with a laterally extending marginal portion 16 which is designed to overlap the adjacent end marginal portion of the sheet 12 comprising the section 10 so that when both sections are suspended in perpendicular position as shown in the drawing, the marginal portion 16 of the section 11 will overlap the corresponding marginal portion of the section 10 as before stated, both sections being then in position in front of the eyes of the user of the device. The device will be so worn during daylight hours so as to protect the eyes from the glare of the sun, but at night it is preferable to swing the section 11 upwardly and rearwardly until it occupies substantially the position shown in dotted lines in the figure of the drawing, in which position it will rest upon one of the arms 6 and upon the visor of the cap or the brim of the hat to which the device is applied. When this section is swung to this position, the user of the device may have an unobstructed view of the roadway and at the same time, the section 10 will afford sufficient protection from the glare of the headlights of an oncoming machine. In the ordinary position of the head, the sections will not interfere with the clear vision of the user as they will occupy a more or less elevated position, but when meeting an approaching machine having glaring headlights, a slight forward inclination of the user's head will serve to lower the glare screen sections to position in the line of vision of the user, thereby protecting the eyes.

By reference to the drawings, it will be observed that the lower margins or edges of the sheets 10 and 11 are inclined upwardly from the outer ends of the said sheets and meet or register at their more elevated ends.

Having thus described the invention, what I claim is:

1. A device of the class described comprising a frame including resilient rearwardly extending side arms adapted to embrace the body portion of a hat or cap and grip the same for the support of the frame thereon and further including arms extending forwardly from the hat embracing arms, a cross rod extending between the forwardly extending arms and supported thereby, and a light screen suspended from the said cross rod.

2. A device of the class described comprising a frame for attachment to a hat or cap and having side arms extending in a forward direction therefrom, a cross rod extending between and supported by the forward ends of said arms, and a light screen comprising two sections swingingly suspended from the said cross rod for the full length thereof and independently movable about said rod as an axis, said arms converging rearwardly whereby when not in use, one of the said screen sections may be swung upwardly and rearwardly to an inoperative position with its outer end portion upon the relatively adjacent one of the said arms.

3. In a device of the class described, a frame for attachment to a hat or cap and having forwardly extending arms, a rod extending between and supported by the arms, and screen sections suspended from the rod and each comprising a sheet of substantially transparent light ray transmitting material, and a suspension member comprising a sleeve having flanges between which the upper margin of each sheet is secured, said screen sections occupying said rod for its full length between said arms and one of said screen sections having an extended inner end portion overlapping the adjacent inner end portion of the other section.

4. A device of the class described comprising a frame of resilient material and including side members, an arcuate member extending between and connecting the side members and bowed in a forward direction, the side members and arcuate member being designed to respectively grip the sides and front of the head receiving portion of a cap or hat to which the device is to be attached, the said frame further including arms extending forwardly from the side members, a rod extending between and supported by the forward ends of said arms, and a light screen suspended for swinging movement from the said rod.

5. A device of the class described comprising a frame formed from a strip of resilient wire bent intermediate its length to provide a U-shaped yoke having a bridge portion and arms extending therefrom and adapted to grip the crown portion of a hat from opposite sides, said arms being bent back upon themselves and extending beyond the bridge portion of said yoke, a cross rod extending between the forward ends of said arms, and a shield pivotally mounted upon said cross rod and adapted to be swung from a depending operative position upwardly and rearwardly to a substantially horizontal inoperative position.

In testimony whereof I affix my signature.

CHRISTIAN THOMPSON.